Figure 1:
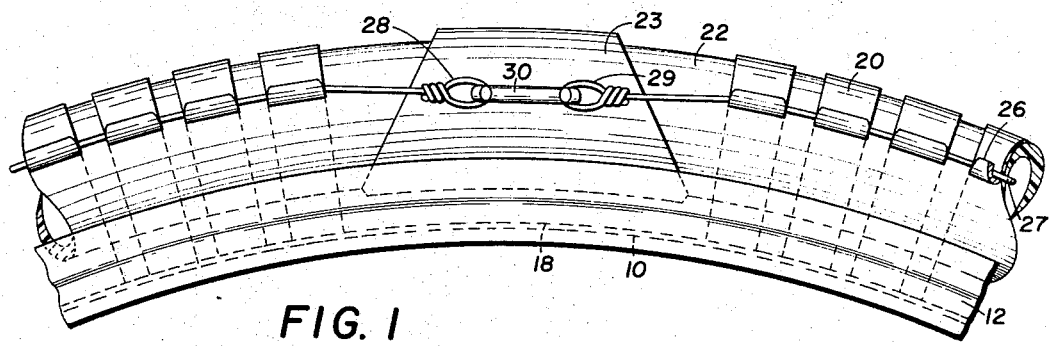

April 9, 1968     B. I. WHITLOCK     3,377,106

DUAL RIM SPACER BAND WHEEL BALANCER INSTALLATION

Filed Sept. 22, 1966

INVENTOR
BEAUFORD I. WHITLOCK

ATTORNEY

United States Patent Office 3,377,106
Patented Apr. 9, 1968

3,377,106
DUAL RIM SPACER BAND WHEEL BALANCER INSTALLATION
Beauford I. Whitlock, Stafford, Kans., assignor to AWB Manufacturing Co., Inc., Stafford, Kans., a corporation of Kansas
Filed Sept. 22, 1966, Ser. No. 581,272
7 Claims. (Cl. 301—5)

This invention relates to wheel balancers, and more particularly to improved dynamic wheel balancing apparatus mounted between dual tires.

Many previously devised dynamic wheel balancers have employed an annular casing containing a plurality of solid spheres or other weight distributing means, along with a damping fluid. When such a balancer is centered on a rotating body such as a wheel, the spheres and fluid are distributed in the casing so that the center of mass of the entire combination coincides with the center of rotation. This eliminates the vibration and uneven wear caused by out-of-balance rotation.

Various ways of affixing such an annular casing to a wheel have been attempted. Many require that a plurality of clamps be used in securing the balancer to the wheel. Others require, in the manufacture of the balancer itself, extensive welding sufficient to provide a fluid-tight annular casing.

A further disadvantage of many prior systems is that the annular casing is mounted touching the wheel. Since heat is generated in the wheel system, there is considerable heat transfer through the casing. This causes a thinning of the fluid in the casing, thus reducing its damping effect. Further, the heat transfer limits the materials which may be used to form the casing. Many materials would otherwise be desirable because of durability and ease of fabrication but are not used because of the effects of heat on such materials.

In one aspect of the present invention, an apparatus is provided for dynamic wheel balancing, which apparatus includes an improved coupling of an annular casing containing balls and fluid and a wheel having dual mounted tires. In a further aspect of the present invention, a balancer is provided which does not require the usual clamping means to be placed in operating position.

In a further aspect of the present invention, a dynamic wheel balancing apparatus is provided in which an annular casing is positioned away from the surface of the wheel to reduce heat transfer to and through the casing.

In accordance with the present invention, a dynamic wheel balancer employs an annular tube containing balls and damping fluid. The tube is secured to a circular spacer band by a clamp ring, one portion of which is a circular strip which engages the outside of the band. Extending out from the circular strip of the clamp ring are a plurality of hook-shaped fingers which are shaped to receive the tube. The tips of the fingers are bent outward to form a channel running along the tips of the fingers parallel to the band. The tube is secured in the fingers by a tensile loop which engages the tips of the fingers in the channel. The assembled balancer is then placed in operation simply by positioning the spacer band between the dual tires.

Figure 2:
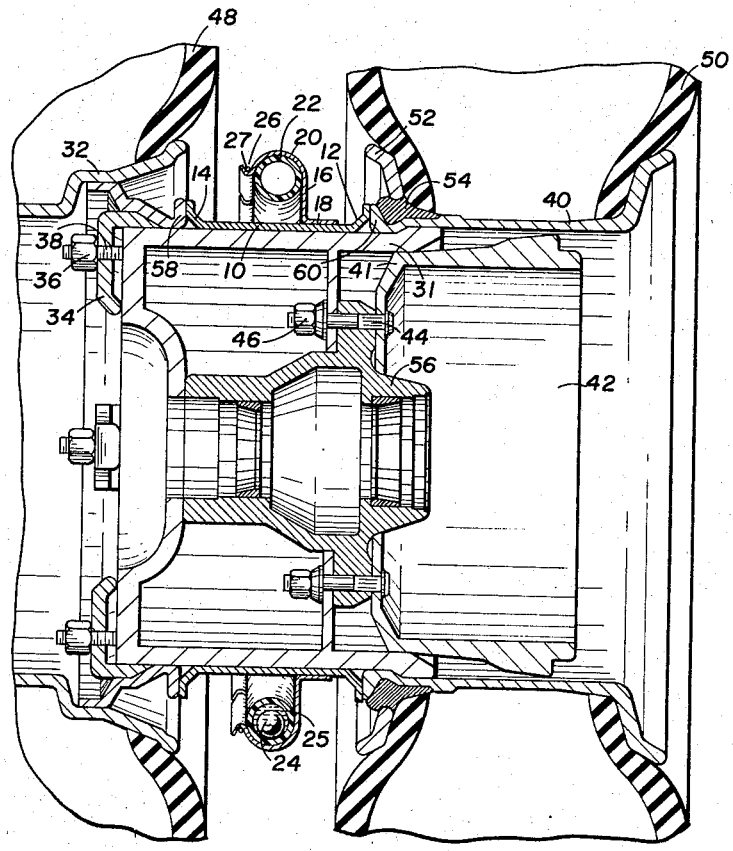

For a more complete understanding of the present invention and for further objects and advantages thereof, reference may now be had to the following description taken in conjunction with the accompanying drawings in which:

FIGURE 1 is an elevational view of a section of an apparatus embodying the present invention; and FIGURE 2 is an elevational view, partially in section, of the apparatus of FIGURE 1, in operating position on a wheel with dual mounted tires.

In FIGURES 1 and 2, a circular spacer band 10 is provided with upstanding flanges 12 and 14. On the outer surface of band 10, between flanges 12 and 14, is secured a clamp ring 16. The ring 16 has a circular strip 18 which engages the outer surface of band 10. The engagement between band 10 and circular strip 18 of ring 16 may be made secure by such means as spot welding.

Ring 16 has hook-shaped fingers 20 extending radially outward from the strip 18 which serve to receive an annular balancer tube 22. The tube 22 may be of the type disclosed in U.S. Patent No. 3,164,413 to Salathiel. It is formed by joining the ends of a piece of plastic tubing together by means of a collar 23. The tube 22 contains a plurality of balls such as ball 24 and a damping fluid 25, as are well known in the art.

The fingers 20 are shaped to hold tube 22 away from the band 10. The straight portion of each of the fingers 20 is of sufficient length that the inward facing surface of the arcuate portion of that finger is a distance from band 10 greater than the diameter of tube 22. The tips of the fingers 20 are bent outward to form a channel 26. A lock wire 27 forms a tensile loop around ring 16 in channel 26. The fingers 20 are tightened around tube 22 by the tension in wire 27. Looped ends 28 and 29 of wire 27 engage an open link 30.

The ring 16 should be formed from a malleable metal. The fingers 20 of ring 16 may be formed in one stamping operation. Ring segments so produced may be used to produce balancers for various sized wheels. Such segments may be cut into appropriate lengths for the size of balancers to be accommodated. The ring 16 may then be formed and secured on band 10.

The apparatus is particularly suitable for operation on wheels with dual mounted tires. As shown in FIGURE 2, band 10 is concentrically mounted on wheel 31. Wheel 31 has mounted thereto an outer rim 32 which is secured in place by clamps 34 and nuts 36 which engage bolts 38 extending from wheel 31. Wheel 31 also carries an inner rim 40 which is held to wheel 31 by a force exerted through circular band 10 and outer rim 32 as applied by clamp 34 and nut 36 engaging bolt 38, against the 28° mounting bevel 41. Brake drum 42 is also secured to wheel 31 by studs 44 and nuts 46. Outer rim 32 has mounted thereon a tubeless tire 48 and inner rim 40 is shown with a conventional tire 50 which is retained at its inner edge by side ring 52 and lock ring 54. Inner rim 40 may also be constructed with a similar base but equipped with a single combination side and lock ring. Bearing hub 56 is formed as an integral part of wheel 31, which is commonly known to those skilled in the art as a hub integral cast spoke, remountable wheel.

The cross-sectional drawing of FIGURE 2 is a composite of a dual tired assembly mounted on a conventional cast spoke wheel 31 to indicate that either a drop center rim 32 with tubeless tire 48 or a flat base rim 40 with conventional tire 50 may be incorporated in the same assembly. Either tire and rim assembly will function in the inner or outer position or the dual assembly may be made up with like rims in inner and outer position providing the diameters of the respective tires are within accepted tolerance. Band 10 is secured from rotation relative to wheel 31 by its frictional engagement with the inner lip 58 of rim 32 and the outer lip 60 of rim 40.

Thus, it will be seen that there is provided a dual wheel mounting system for an annular dynamic wheel balancer tube. The system includes a dual wheel spacer band with a clamp ring of radially extending resilient fingers secured adjacent to their roots to the outer surface of the band. The fingers are partially arcuate to form an inwardly facing annular seat which receives the tube. The fingers have outwardly directed tips which form an outwardly facing annular channel. A tensile loop engages the finger tips in the channel to clamp the tube to the band in a coaxial relation. Preferably, the fingers are common at their roots to a circular strip which is welded to the outer surface of the spacer band. The fingers are of such length that the distance from the outer surface of the spacer band to the inner surface of the inwardly facing seat is greater than the diameter of the tube so that the tube will be spaced from the spacer band. The fingers are curved so that they extend through an arc greater than 90°. In a preferred form, the fingers are formed of flat resilient strips, the major surfaces of which are all common to a plane perpendicular to the axis of the spacer band.

Having described the invention in connection with certain specific embodiments thereof, it is to be understood that the further modifications may now suggest themselves to those skilled in the art and it is intended to cover such modifications as fall within the scope of the appended claims.

What is claimed is:

1. A system for mounting an annular dynamic balancer tube between dual wheel rims which comprises:
    (a) a dual wheel spacer band,
    (b) a clamp ring for resilient fingers secured at their radially inner ends adjacent to the outer surface of said band, said fingers extending radially outwardly and curving radially inwardly to form an inwardly facing annular seat for receiving said tube and having tips bent radially outwardly to form an outward facing annular channel, and
    (c) a tensile loop engaging said tips in said channel to clamp said tube coaxially with respect to said ring.

2. The combination set forth in claim 1 wherein a plurality of said fingers extend from a circular strip, which strip is welded to the surface of said band.

3. The combination set forth in claim 2 wherein all said fingers are common to the same circular strip.

4. The combination set forth in claim 1 wherein the distance from the inner surface of said inwardly facing seat to said band is greater than the diameter of said tube.

5. The combination set forth in claim 1 wherein said fingers are arcuate through an angle which is greater than 90°.

6. The combination set forth in claim 1 wherein said fingers are flat resilient strips, the major surfaces of which are all common to a plane perpendicular to the axis of said band.

7. A system for mounting an annular dynamic balancer tube between dual wheel rims which comprises:
    (a) a dual wheel spacer band,
    (b) a clamp ring including radially extending finger means engaging at their radially inner ends the outer surface of said band, said finger means curving radially inwardly at their radially outer ends to form an inwardly facing annular seat for receiving said tube, and
    (c) a tension applying means engaging said finger means to clamp said tube coaxially with respect to said band.

References Cited

UNITED STATES PATENTS

| | | | |
|---|---|---|---|
| 1,855,645 | 4/1932 | McIntosh | 248—63 X |
| 3,168,348 | 2/1965 | Fleming | 301—13 X |
| 3,191,997 | 6/1965 | Colvert | 301—5 |
| 3,314,726 | 4/1967 | Rehnborg | 301—5 |

RICHARD J. JOHNSON, *Primary Examiner.*